(12) United States Patent
de Brébisson

(10) Patent No.: US 7,272,621 B2
(45) Date of Patent: Sep. 18, 2007

(54) PREVIOUS CALCULATION REUSE IN A CALCULATOR

(75) Inventor: Cyrille de Brébisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 10/636,778

(22) Filed: Aug. 8, 2003

(65) Prior Publication Data

US 2005/0033783 A1 Feb. 10, 2005

(51) Int. Cl.
*G06F 3/00* (2006.01)
(52) U.S. Cl. ...................... 708/131; 708/175
(58) Field of Classification Search ................ 708/131, 708/145
See application file for complete search history.

(56) References Cited

U.S. PATENT DOCUMENTS 5,067,102 A * 11/1991 Eisenstein ................... 708/142
5,189,633 A * 2/1993 Bonadio ..................... 708/142
6,795,838 B1 * 9/2004 Kataoka ..................... 708/160
6,956,560 B2 * 10/2005 Brothers et al. ............ 345/149

OTHER PUBLICATIONS

Texas Instruments: TI-89/Voyage™ 200 Calculator Home Screen, May 30, 2003 http://web.archive.org/web/20030530170656/http://education.ti.com/downloads/guidebooks/eng/calc_home-eng.pdf.
Ralph Brown: "Napier" Apr. 30, 2001 http://web.archive.org/web/20010430133653/http://www.nca-corp.com/Napier/Distributions/NapierDocDOC.exe.

* cited by examiner

*Primary Examiner*—Chuong D. Ngo

(57) ABSTRACT

A method of reusing an expression in a hand-held calculator and corresponding apparatus therefore are described. At least one user-entered expression is received and displayed. The user-entered expression is evaluated and the result displayed. A first user input requesting reuse of one of the previously displayed expressions is received and one of the previously displayed expressions is displayed for editing by the user. A second user input requesting reuse of one of the previously displayed expressions is received and one of the previously displayed expressions is displayed for editing by the user at the same time as the previously displayed expression responsive to the first user input.

18 Claims, 3 Drawing Sheets

PREVIOUS CALCULATION REUSE IN A CALCULATOR

RELATED APPLICATIONS

This application is related to each of the following applications: "Graphical Calculator User Interface for Function Drawing" Ser. No. 10/636,752; "Function Drawing in Polar Plan Using a Calculator" Ser. No. 10/636,752; "Input and Evaluation of Fractions Using a Calculator" Ser. No. 10/636,752; and "Graphical Calculator" Ser. No. 10/636,752, each assigned to the present assignee, all of which are hereby incorporated by reference in their entirety, and all of which are being filed concurrently herewith.

FIELD OF THE INVENTION

The present invention relates to a method of and apparatus for previous calculation reuse in a hand-held calculator.

BACKGROUND

A hand-held calculator is an important and useful device. Similar to a computer, the hand-held calculator has a processor, a memory, a display, and an input device; however, there are important distinguishing differences between the hand-held calculator and the computer.

The hand-held calculator is a specialized device and not a general purpose device, as is true of a computer. Because of this specialization, typically the hand-held calculator costs less, has a longer useful lifespan, and is more reliable and more portable than the computer.

Whereas a general purpose computer is capable of executing many different programs, a hand-held calculator typically executes a single program and less frequently supports execution of user-created programs. Normally, a hand-held calculator supports addition, subtraction, multiplication, and division of numbers, either integer-based or decimal-based, entered by a user and displays the results on a built-in display.

A graphical calculator is a further specialized version of a hand-held calculator having a display which is typically larger than a regular hand-held calculator display in order to enable graph output. In many instances, graphical calculator displays are liquid crystal displays for more accurate representation and enhanced readability of a graph output.

A graphical calculator is able to display a graph of a specific expression, e.g. a sine wave representing a sinusoidal function, entered by a user. Disadvantageously, graphical capabilities on hand-held calculators are only available as part of expensive and complex, "high end" scientific calculators. These graphical calculators are more expensive than other calculators, typically costing hundreds of dollars. These graphical calculators are more complicated to operate than other calculators because of the large amount of functionality incorporated therein.

The increased functionality has required a corresponding increase in the number of keys required for manipulating and using the calculator. For example, currently available graphical calculators have approximately fifty (50) keys including two (2) shift or modifier keys for a user to manipulate, e.g. a Texas Instruments (TI) 83 plus calculator has 51 keys and two (2) shift keys which can be used concurrently, enabling up to four functions to be assigned per the 51 remaining keys, and a Hewlett-Packard (HP) 48G+/GX calculator has 49 keys and three (3) shift keys, enabling up to six functions to be assigned per the remaining 49 keys.

Additionally, and in conjunction with the larger number of keys present, a user must contend with different modes of operation of the current graphical calculator. Different modes of operation, accessible via specific keys and/or key sequences, must be utilized in order to access specific calculator functionality, e.g. a graphical calculator may include a decimal mode, a binary mode, a hexadecimal mode, a finance mode, a statistics mode, and a graph mode.

Further, expression input requires increasingly complicated key manipulations and combinations. For example, in order to graph an expression, there are typically three combinations to be entered: a mode specifying combination, an expression entry combination, and a completion combination. The mode specifying combination may include manipulation of a graph key to instruct the calculator to graph the following expression entry. The expression entry combination may include manipulation of multiple keys to input the expression to be graphed and the completion combination includes manipulation of a key, e.g. an enter key, to instruct the calculator to perform the preceding operations, i.e. graph the entered expression.

Requiring a user to manipulate multiple keys increases the need for learning, the possibility of error and may lead to frustration on the part of the user. Also, requiring additional key presses by a user requires more time and slows the entry and use of the calculator by the user. The addition of multiple modes, complicated expression input combinations, and ever-increasing numbers of keys results in a very complicated device.

As further evidence of increasing complexity, the user manual for a currently available hand-held graphical calculator has dramatically increased in size in order to fully explain the use of the calculator. For example, the above-cited TI-83 plus calculator manual includes 269 pages and the HP 48G+/GX calculator manual includes 506 pages. These are very long documents which are typically not read by users. Further, users are likely to be deterred from reading the manual because of the imposing size of the manual.

Graphical calculators are very popular and effective educational aides. School students using graphical calculators can easily visualize complex functions; however, the complexity and cost of currently available graphical calculators deters many students and schools from making a purchase. Purchasers are dissuaded by the size of the manual, multiple modes of operation, and the number of keys and key combinations required for inputting expressions.

Prior hand-held calculators of which the inventor is aware, enable a user to edit a previous entry input to the calculator. For example, a user may input the following two expressions for calculation by the calculator:

$1+2*4/(5*6+4)$                                              Expression A $1*7/4+58-44/56$                                        Expression B In order to modify one of the Expressions A or B, the user manipulates, for example, an up and down key to cause the display of Expression A or B on the calculator. After displaying the Expression A or B, the user modifies the expression as desired and provides the expression as input to the calculator for calculation.

Disadvantageously, the above-described approach restricts the user's choice of expressions for editing to only one of Expression A or B. Even if the user has input more than one expression for calculation, the user is only able to select one of the input expressions for editing and reuse as a subsequent calculation.

If the user desires to combine both Expression A and B in a single calculation, the user may select one of the expressions for reuse, but the user is then forced to input again the expression which was not selected. Problematically, the user is likely to mis-key the second expression and, at a minimum, additional keystrokes are required to input both expressions. Additional keystrokes necessitates more complexity, more time for input, and increased chance of an input error and frustration for the user.

There is a need in the art for a method of and apparatus for previous calculation reuse in a hand-held calculator.

SUMMARY

It is therefore an object of the present invention to provide a method of and apparatus for previous calculation reuse in a hand-held calculator.

The present invention provides a method of and apparatus for previous calculation reuse in a hand-held calculator.

A method of reusing an expression in a hand-held calculator includes receiving and displaying a user-entered expression. The user-entered expression is evaluated and the result displayed. A first user input requesting reuse of one of the previously displayed expressions is received and an expression displayed. A second user input requesting reuse of a previously displayed expression is received. In response to receipt of the second user input, the previously displayed expressions responsive to the first user input and second user input are displayed at the same time for editing by the user.

A further method aspect of reusing an expression in a hand-held calculator includes receiving a first user input requesting reuse of a previously displayed expression. Responsive to receipt of the first user input, one of the previously displayed expressions is displayed for editing by the user. After receipt of the first user input, a second user input requesting reuse of one of the previously displayed expressions is received. Responsive to receipt of the second user input, one of the previously displayed expressions responsive to the second user input is displayed at the same time as the previously displayed expression responsive to the first user input for editing by the user.

An apparatus aspect of a hand-held calculator enabling reuse of a previous expression includes an input area of the calculator for receiving: at least one user-entered expression; a first user input to reuse a previously displayed expression; a second user input to reuse a previously displayed expression; and a user-entered input to edit an expression. A display connected to the calculator for displaying the at least one user-entered expression received at the input area and an evaluated user-entered expression. A processor for evaluating the user-entered expression received at the input area and driving the display to display the evaluated user-entered expression. Responsive to the first user input to reuse a previously displayed expression and the second user input to reuse a previously displayed expression, the processor drives the display to display the at least two previously displayed expressions responsive to the first user input and second user input at the same time. Responsive to the user-entered input to edit an expression, the processor edits the at least two previously displayed expressions and drives the display to display the edited expressions.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
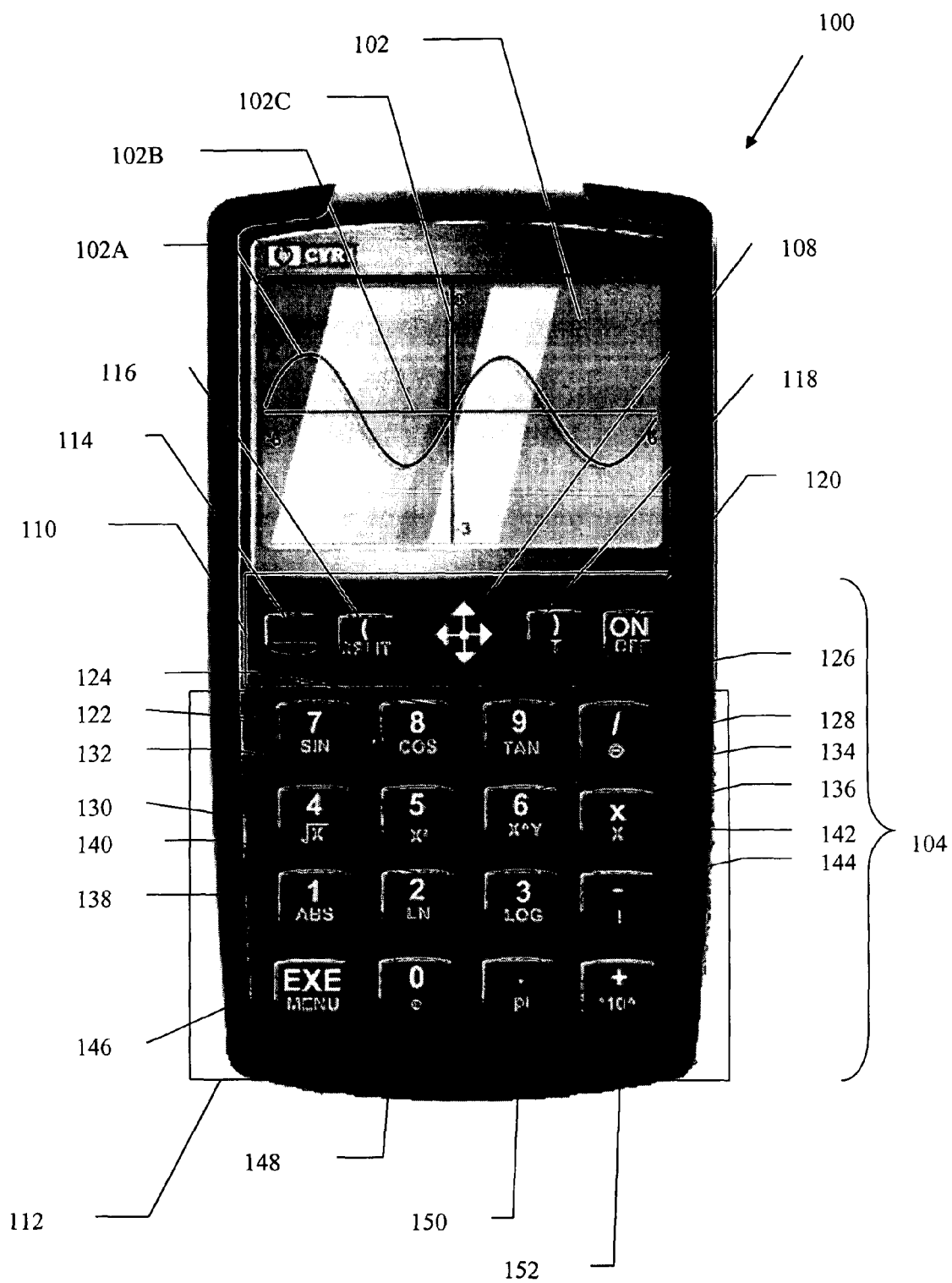
FIG. 1 is a front face view of a graphical calculator according to an embodiment of the present invention.

FIG. 1 is a front face view of a graphical calculator 100 according to an embodiment of the present invention.

Calculator 100 includes a display 102 and a primarily key-based input area 104 set in a front face 106. Although front face 106 is depicted as a rounded rectangle, it is to be understood that the front face may be manufactured to be any of a number of different shapes. Further, although a specific number, type and configuration of input mechanisms are described below, it is to be understood that variations in the number, type, and configuration of input mechanisms may be found in different embodiments of the present invention.

Display 102 is a rectangular liquid crystal display (LCD) which is 96 pixels wide and 64 pixels in height. As shown in FIG. 1, display 102 displays a sine wave 102A on a graph having an X axis 102B and a Y axis 102C. Input area 104 includes four keys and one directional input device 108 in a row 110 and 16 keys arranged in a four by four grid 112. Although a four by four grid is depicted and described, it is to be understood that the input area keys may be arranged in different configurations.

Directional input device 108, as described in detail below, is used to navigate menus and perform information input, recall, and editing. Directional input device 108 may be manipulated by the user to input at least four directions, i.e. up, down, left, and right to calculator 100. The four keys in row 110 are shift key 114, open parenthesis key 116, close parenthesis key 118, and power key 120.

Shift key 114 is used to access a second set of functions, i.e. secondary functions, assigned to the remaining keys on calculator 100. For example, user activating power key 120 turns on calculator 100; however, activation of power key 120 subsequent to activation of shift key 114 turns off the calculator. In a similar fashion, each of the remaining keys of calculator 100 has an assigned secondary function.

Open parenthesis key 116 inputs a beginning parenthesis in a user-entered expression. The secondary function of open parenthesis key 116 is to input a command causing calculator 100 to split a graphical output on display 102 such that one half of the display is a graph and the other half is numerical information related to the graph displayed.

Close parenthesis key 118 inputs an ending parenthesis in a user-entered expression. The secondary function of close parenthesis key 118 is to input a T variable in a user-entered expression.

Power key 120 turns on calculator 100 and, as described above, the secondary function of power key 120 is to turn off calculator 100. Additionally, power key 120 operates as a clear key after calculator 100 is turned on, i.e. the power key may be used to clear the displayed expression on display 102. Manipulation of shift key 114 followed by right arrow of directional input device 108 deletes input characters to the right of the current input position and manipulation of shift key 114 followed by left arrow of directional input device 108 deletes input characters to the left of the current input position.

Beginning in the upper left corner of four by four grid 112, the description of the remaining keys is now provided in a row, column order.

Row 1, column 1 key 122, i.e. the seven key, inputs a seven (7) value in a user-entered expression and has a secondary function of inputting a sin function in a user-entered expression. Row 1, column 2 key 124, i.e. the eight key, inputs an eight (8) value in a user-entered expression and has a secondary function of inputting a cos function in a user-entered expression. Row 1, column 3 key 126, i.e. the nine key, inputs a nine (9) value in a user-entered expression and has a secondary function of inputting a tan function in a user-entered expression. Row 1, column 4 key 128, i.e. the division key, inputs a division (/) function in a user-entered expression and has a secondary function of inputting a theta ($\theta$) variable in a user-entered expression.

Row 2, column 1 key 130, i.e. the four key, inputs a four (4) value in a user-entered expression and has a secondary function of inputting a square root function in a user-entered expression. Row 2, column 2 key 132, i.e. the five key, inputs a five-(5) value in a user entered expression and has a secondary function of inputting a squared function, i.e. raising a value to the second power, in a user-entered expression. Row 2, column 3 key 134, i.e. the six key, inputs a six (6) value in a user-entered expression and has a secondary function of inputting a value raised to the power of a subsequently entered value function, i.e. X raised to the power of Y, in a user-entered expression. Row 2, column 4 key 136, i.e. the multiplication key, inputs a multiplication (*) function in a user-entered expression and has a secondary function of inputting an X variable in a user-entered expression.

Row 3, column 1 key 138, i.e. the one key, inputs a one (1) value in a user-entered expression and has a secondary function of inputting an absolute value function in a user-entered expression. Row 3, column 2 key 140, i.e. the 2 key, inputs a two (2) value in a user-entered expression and has a secondary function of inputting a natural logarithm function in a user-entered expression. Row 3, column 3 key 142, i.e. the three key, inputs a three (3) value in a user-entered expression and has a secondary function of in putting eight logarithm function in a user-entered expression. Row 3, column 4 key 144, i.e. the minus key, inputs a subtraction (−) function in a user-entered expression and has a secondary function of inputting a NOT function in a user-entered expression.

Row 4, column 1 key 146, i.e. the execute key, inputs an execute command to calculator 100 and has a secondary function of inputting a menu command to the calculator. Row 4, column 2 key 148, i.e. the zero key, inputs a zero (0) value in a user-entered expression and has a secondary function of inputting an e value in a user-entered expression. Row 4, column 3 key 150, i.e. the dot key, inputs a decimal point in a value entry and has a secondary function of in putting a pi constant value in a user-entered expression. Row 4, column 4 key 152, of i.e. the plus key, inputs an addition (+) function in a user-entered expression and has a secondary function of in putting a times ten to the power of a subsequently entered value, i.e. "*10^Y", in a user-entered expression.

Figure 2:
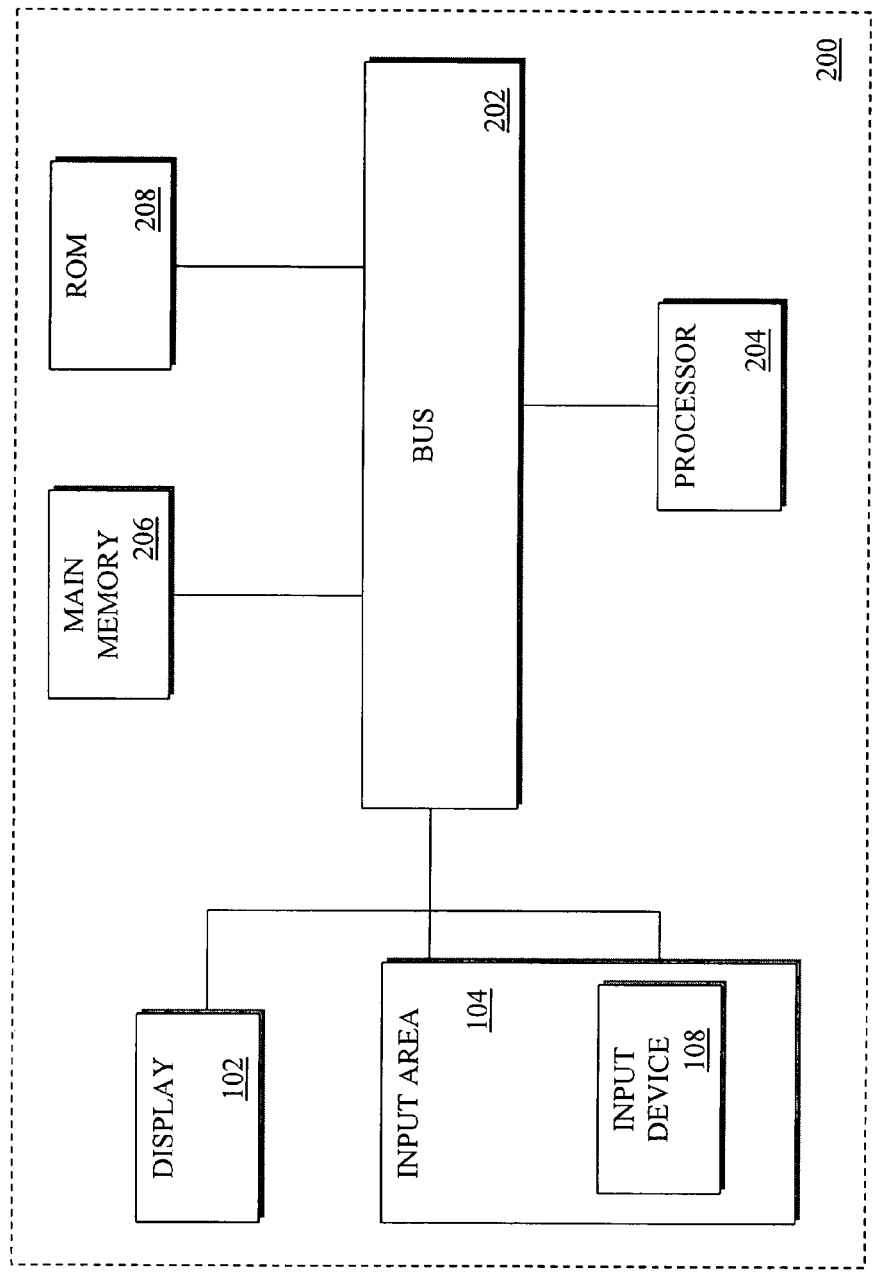
FIG. 2 is a high level block diagram of a graphical calculator according to an embodiment of the present invention.

FIG. 2 is a block diagram illustrating an exemplary calculator 100 upon which an embodiment of the invention may be implemented.

Calculator 100 includes a bus 202 or other communication mechanism for communicating information, and a processor 204 coupled with the bus 202 for processing information. In one particular embodiment, processor 204 is a 16 bit processor. Calculator 100 also includes a main memory 206, such as a random access memory (RAM) or other dynamic storage device, coupled to the bus 202 for storing data and expressions according to an embodiment of the present invention and instructions to be executed by processor 204. Main memory 206 also may be used for storing temporary variables or other intermediate information during execution of instructions to be executed by processor 204. In one particular embodiment, main memory 206 is an 8 Kilobyte RAM. Further, it is to be understood that in alternate embodiments, the components of calculator 100 may be combined onto a single integrated circuit, e.g. processor 204 and main memory 206 may be combined on a single "system on a chip."

Calculator 100 further includes a read only memory (ROM) 208 or other static storage device coupled to the bus 202 for storing static information and instructions for the processor 204. In one particular embodiment, ROM 208 is a 128 Kilobyte ROM.

Calculator 100 may be coupled via the bus 202 to a display 102, such as the above-described 96*64 pixel LCD, for displaying an interface to a user. An input area 104, as described above with reference to FIG. 1, is coupled to the bus 202 for communicating information, e.g. user-entered expressions and values, and command inputs to the processor 204. An input device 108, as described above with respect to FIG. 1, is part of input area 104 and communicates direction information and command selections to processor 204 and controls cursor movement on the display 102. This input device typically has two degrees of freedom in two axes, a first axis (e.g., x) and a second axis (e.g., y) allowing the device to specify positions in a plane.

The invention is related to the use of calculator 100, such as the depicted calculator of FIG. 2, to input and apply operations, e.g. expressions, to data and graph the results of operations by driving display 102. According to one embodiment of the invention, data is stored and accessed from main memory 206 by calculator 200 in response to processor 204 executing sequences of instructions contained in main memory 206 in response to input received via input area 104. A user interacts with the calculator 100 via a user interface displayed (as described below) on display 102.

Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

According to an embodiment of the present invention, a user is able to reuse previously entered expressions and/or previously evaluated expressions, i.e. the results of evaluating user-entered expressions. With reference to Equations A and B above, an example use of a calculator according to an embodiment of the present invention is now provided.

Calculator 100 receives a first user-entered expression, e.g. Equation A, entered via input area 104 and displays the user-entered expression to the user via display 102. Calculator 100, more specifically processor 204, evaluates Equation A and displays the result (Result A) to the user via display 102.

Calculator 100 receives a second user-entered expression, e.g. Equation B, entered via input area 104 and displays the user-entered expression to the user via display 102. Calculator 100, and more specifically processor 204, evaluates Equation B and displays the result (Result B) to the user via display 102.

Each displayed expression is stored in memory 206 in reverse chronological order, i.e. pushes the expressions onto a stack, in calculator 100 for reuse by the user. Storing the displayed expressions in reverse chronological order places the most recently displayed expression at the top of the stack, the next most recently displayed expression below the most recently displayed and so on. In this manner, a user can step backward through the most recently displayed expressions.

A user desiring to reuse either a previously entered user-entered expression, e.g. Equation A or B, or a result of evaluating one of the previously entered user-entered expression, e.g. Result A or B, manipulates directional input device 108 to input an up arrow direction. Processor 204 receives the up arrow direction input from directional input device 108 and displays the most recently displayed expression, i.e. Result B.

The user may then edit Result B using directional input device 108 to move a cursor to the character position at which to edit the result. After positioning the cursor, the user may (a) clear characters from the expression using the power key 120 or (b) add characters, i.e. digits or functions, to the expression using keys input area 104.

Alternatively, the user may decide to choose a different recently displayed expression for use by manipulating directional input device 108 to input another up arrow direction. Processor 204 receives the up arrow direction input from directional input device 108 and displays the second most recently displayed expression, i.e. Equation B. The user may then edit the displayed expression as described above with respect to Result B.

Further alternatively, the user may decide to combine two previously displayed expressions into a single expression to be evaluated by processor 204. For example, the user displays Equation B by manipulating directional input device 108 two times to input an up arrow direction twice. The user then inputs an addition function by manipulating add key 152 to add an addition symbol to the displayed expression. The user then manipulates directional input device 108 two additional times to input an up arrow direction twice to processor 204. In response, processor 204 retrieves Equation A from main memory 206 and appends Equation A to the displayed expression after the addition symbol. The user then manipulates execute key 146 to input the displayed expression (Equation A+Equation B) to processor 204 for evaluation.

Based on the above, the user is able to reuse more than a single previously displayed expression using a minimal number of keys on calculator 100. In the same manner, the user may manipulate the up arrow direction of directional input device 108 to cause processor 204 to retrieve and display the results of evaluating user-entred expressions. For example, the user may wish to add the results of Equation A and B. Instead of combining the two Equations A and B into a single user-entered expression, the user, having Result B displayed on display 102, may input an addition function using add key 152 and manipulate the up arrow direction of directional input device 108 twice in order to add Result A to the displayed expression. The user then manipulates execute key 146 to input the displayed expression (Result A+Result B) to processor 204 for evaluation.

It is to be understood that a user may combine both user-entered expressions and displayed evaluated expressions, i.e. results of evaluating user-entered expressions, using the above-described method. Further, it will be understood by those skilled in the art that different functions, e.g. functions available using the keys and input device 108 of input area 104, may be used in combination with the reused previously displayed expressions.

It is to be further understood that in specific embodiments, the user may effectively move forward and backward through the stack of previously displayed expressions by manipulating the up and down arrows of directional input device 108.

Figure 3:
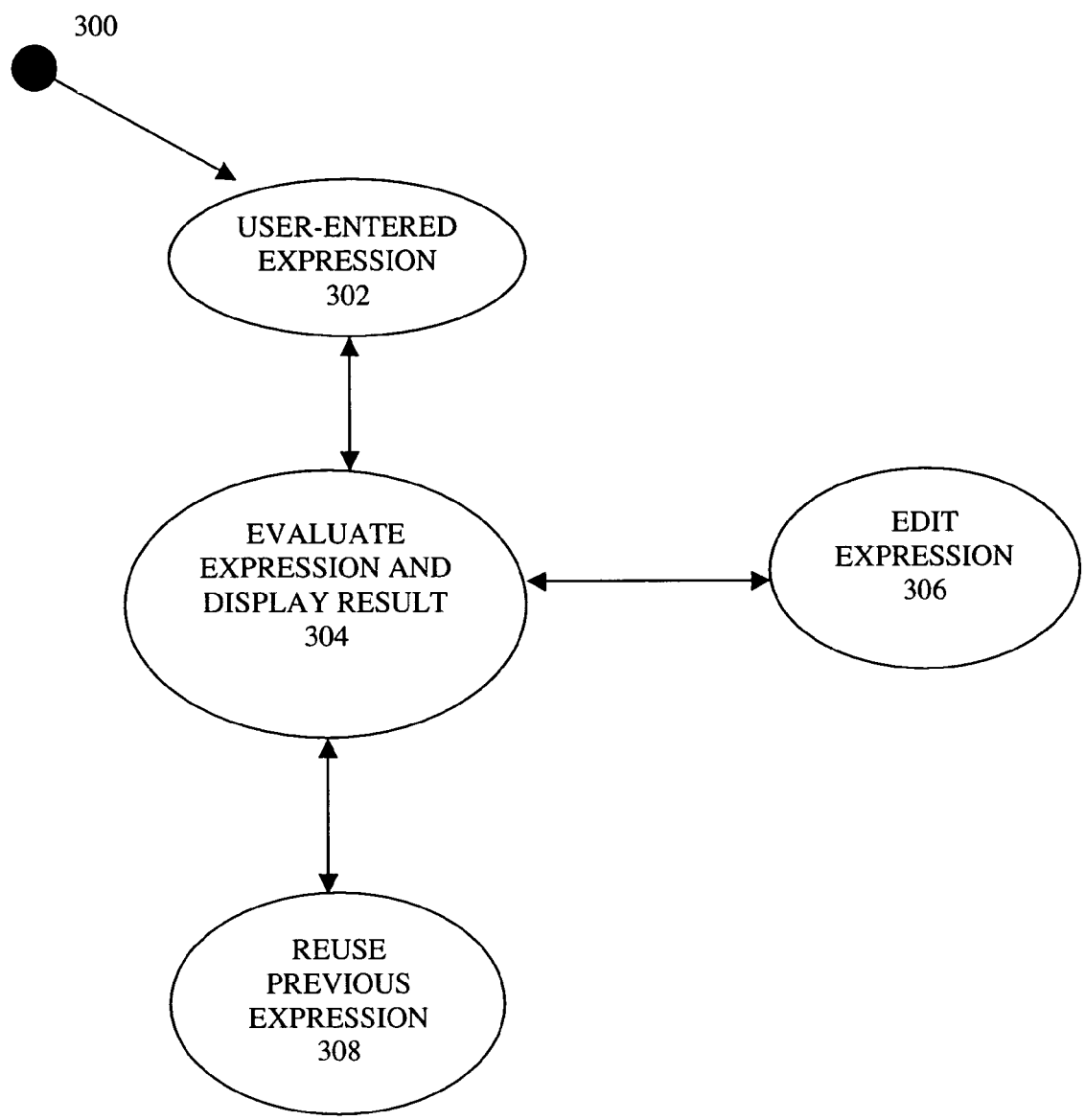
FIG. 3 is a flow of control of a process according to an embodiment of the present invention.

A flow of control of a process according to an embodiment of the present invention is now described with respect to FIG. 3.

The flow of control begins at step 300. At step 302, a user manipulates input area 104 and inputs an expression to processor 204 for display on display 102. The user then manipulates the execute key 146 to input the displayed expression to processor 204 for evaluation and subsequent display of the result at step 304.

The user may then enter another expression by manipulating input area 104 and causing the flow of control to proceed to step 302, as described above. Alternatively, the user may manipulate directional input device 108 and input area 104 to input commands to processor 204 to edit the result displayed in step 306. As described above, the user manipulates input area 104 to add or remove digits and functions and to edit an existing displayed expression on display 102. The user manipulates the execute key 146 to input the edited expression to processor 204 for evaluation and subsequent display of the result in step 304.

Further, in accordance with an embodiment of the present invention, the user may manipulate the up arrow of the directional input device 108 to reuse a previously displayed expression in step 308. The user manipulates the execute key 146 to input the reused previously displayed expression to processor 204 for evaluation and subsequent display of the result in step 304.

A high level pseudo-code listing of an embodiment according to the present invention is listed in Listing 1 below.

Listing 1

```
Do
Wait for user key press
    If key is enter
        Display expression on display
        Clear command line
        Evaluate expression
        Display result on display
    If key is UP or Down and last key was not up or down
        Change selection in previous calculations accordingly to the
        key press
        Insert the current selection in the command line at the place of
        the cursor
    If key is UP or Down and last key was up or Down
        Change selection in previous calculations accordingly to the
        key press
```

-continued

Listing 1

Remove from the command line the last inserted selection, and
insert the current selection in the command line at the place of
the cursor
If key is not enter or up or down
Perform actions normally associated with the key It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of reusing an expression in a hand-held calculator, the method comprising the steps of:
   receiving and displaying at least one user-entered expression;
   evaluating the at least one user-entered expression and displaying the evaluated user-entered expression;
   receiving a first user input requesting reuse of one of the previously displayed expressions, wherein the first user input is a directional input device manipulation;
   responsive to receipt of solely the first user input, displaying one of the previously displayed expressions for editing by the user;
   after receipt of the first user input, receiving a second user input requesting reuse of one of the previously displayed expressions, wherein the second user input is a directional input device manipulation; and
   responsive to receipt of solely the second user input, displaying one of the previously displayed expressions responsive to the second user input at the same time as the previously displayed expression responsive to the first user input for editing by the user.

2. The method as claimed in claim 1, further comprising the step of:
   receiving the previously displayed expressions responsive to the first user input and the second user input as a single user-entered expression for evaluation.

3. The method as claimed in claim 1, wherein the previously displayed expressions displayed responsive to the first user input and the second user input are user-entered expressions.

4. The method as claimed in claim 1, wherein the previously displayed expressions displayed responsive to the first user input and the second user input are evaluated user-entered expressions.

5. The method as claimed in claim 1, wherein the previously displayed expressions displayed responsive to the first user input and the second user input are a user-entered expression and an evaluated user-entered expression.

6. The method as claimed in claim 1, wherein the displaying one of the previously displayed expressions for editing by the user comprises inserting the one of the previously displayed expressions into a command line of the calculator.

7. A hand-held calculator enabling reuse of a previous expression, the calculator comprising:
   an input area of the calculator for receiving at least one user-entered expression, a first user input to reuse a previously displayed expression, a second user input to reuse a previously displayed expression, and a user-entered input to edit an expression, wherein the input area comprises a directional input device for generating the first user input and the second user input;
   a display connected to the calculator for displaying the at least one user-entered expression received at the input area and an evaluated user-entered expression;
   a processor for evaluating the user-entered expression received at the input area and driving the display to display the evaluated user-entered expression; responsive to solely the first user input to reuse a previously displayed expression and solely the second user input to reuse a previously displayed expression, driving the display to display the at least two previously displayed expressions responsive to the first user input and second user input at the same time; responsive to the user-entered input to edit an expression, editing the at least two previously displayed expressions and driving the display to display the edited expressions.

8. The calculator as claimed in claim 7, wherein the processor evaluates the at least two previously displayed expressions as a single user-entered expression.

9. The calculator as claimed in claim 7, wherein the previously displayed expressions displayed responsive to the first user input and the second user input are user-entered expressions.

10. The calculator as claimed in claim 7, wherein the previously displayed expressions displayed responsive to the first user input and the second user input are evaluated user-entered expressions.

11. The calculator as claimed in claim 7, wherein the previously displayed expressions displayed responsive to the first user input and the second user input are a user-entered expression and an evaluated user-entered expression.

12. The calculator as claimed in claim 7, wherein the processor driving the display to display the at least two previously displayed expressions comprises inserting the at least two previously displayed expressions into a command line displayed on the display.

13. A method of reusing an expression in a hand-held calculator, the method comprising the steps of:
   receiving a first user input requesting reuse of one of a previously displayed expressions, wherein the first user input is a directional input device manipulation;
   responsive to receipt of solely the first user input, displaying one of the previously displayed expressions for editing by the user;
   after receipt of the first user input, receiving a second user input requesting reuse of one of the previously displayed expressions, wherein the second user input is a directional input device manipulation; and
   responsive to receipt of solely the second user input, displaying one of the previously displayed expressions responsive to the second user input at the same time as the previously displayed expression responsive to the first user input for editing by the user.

14. The method as claimed in claim 13, further comprising the step of:
   receiving the previously displayed expressions responsive to the first user input and the second user input as a single user-entered expression for evaluation.

15. The method as claimed in claim 13, wherein the previously displayed expressions displayed responsive to the first user input and the second user input are user-entered expressions.

16. The method as claimed in claim 13, wherein the previously displayed expressions displayed responsive to the first user input and the second user input are evaluated user-entered expressions.

17. The method as claimed in claim 13, wherein the previously displayed expressions displayed responsive to the first user input and the second user input are a user-entered expression and an evaluated user-entered expression.

18. The method as claimed in claim 13, wherein the displaying one of the previously displayed expressions for editing by the user comprises inserting the one of the previously displayed expressions into a command line of the calculator.

* * * * *

UNITED STATES PATENT AND TRADEMARK OFFICE
CERTIFICATE OF CORRECTION

| | | |
|---|---|---|
| PATENT NO. | : 7,272,621 B2 | Page 1 of 1 |
| APPLICATION NO. | : 10/636778 | |
| DATED | : September 18, 2007 | |
| INVENTOR(S) | : Cyrille de Brèbisson | |

It is certified that error appears in the above-identified patent and that said Letters Patent is hereby corrected as shown below:

In column 1, line 9, delete "Ser. No. 10/636,752" and insert -- Ser. No. 10/636,781 --, therefor.

In column 1, lines 10-11, delete "Ser. No. 10/636,752" and insert -- Ser. No. 10/636,785 --, therefor.

In column 1, line 11, delete "Ser. No. 10/636,752" and insert -- Ser. No. 10/636,780 --, therefor.

Signed and Sealed this

Seventeenth Day of November, 2009

David J. Kappos
*Director of the United States Patent and Trademark Office*